US012673555B2

(12) United States Patent
Beltramin

(10) Patent No.: US 12,673,555 B2
(45) Date of Patent: Jul. 7, 2026

(54) CHARGE RECEIVING SYSTEM

(71) Applicant: Progress Rail Locomotive Inc,
LaGrange, IL (US)

(72) Inventor: Sidarta Fornari Beltramin, Curitiba
(BR)

(73) Assignee: Progress Rail Locomotive Inc.,
LaGrange, IL (US)

( * ) Notice: Subject to any disclaimer, the term of this
patent is extended or adjusted under 35
U.S.C. 154(b) by 874 days.

(21) Appl. No.: 17/894,594

(22) Filed: Aug. 24, 2022

(65) Prior Publication Data

US 2024/0066994 A1 Feb. 29, 2024

(51) Int. Cl.
B60L 5/18 (2006.01)

(52) U.S. Cl.
CPC ............. B60L 5/18 (2013.01); B60L 2200/26
(2013.01)

(58) Field of Classification Search
CPC .................................. B60L 53/14; B60L 5/18
See application file for complete search history.

(56) References Cited

U.S. PATENT DOCUMENTS

| | | | | |
|---|---|---|---|---|
| 8,324,858 B2 * | 12/2012 | Hill | ......................... | B60L 5/005 |
| | | | | 180/312 |
| 2013/0092492 A1 * | 4/2013 | Andre | ..................... | B60L 53/32 |
| | | | | 191/47 |
| 2014/0070767 A1 * | 3/2014 | Morris | ...................... | B60L 5/42 |
| | | | | 320/109 |
| 2017/0210237 A1 * | 7/2017 | Buehs | .................... | H01M 10/44 |
| 2020/0411811 A1 * | 12/2020 | Singer | ................. | H01M 10/425 |
| 2021/0237601 A1 * | 8/2021 | Kim | ......................... | B60L 53/32 |

FOREIGN PATENT DOCUMENTS

| | | |
|---|---|---|
| CN | 109484188 | 3/2019 |
| CN | 109720231 | 5/2019 |
| WO | WO2021259283 | 12/2021 |

* cited by examiner

*Primary Examiner* — Scott A Browne

(57) ABSTRACT
A charge receiving system comprises a first charge receiving rail and a second charge receiving rail attached to a roof of a compartment of a locomotive. The first charge receiving rail is disposed at a first angle relative to a center line of the roof in a longitudinal direction of the locomotive and extends beyond a first edge of the roof, and is configured to electrically contact a first charging contact of an external charging unit and electrically connect to a first polarity terminal of one or more batteries. The second charge receiving rail is disposed at a second angle relative to the center line of the roof and extends beyond the first edge of the roof, and is configured to electrically contact a second charging contact of the external charging unit and electrically connect to a second polarity terminal of the one or more batteries.

20 Claims, 11 Drawing Sheets

CHARGE RECEIVING SYSTEM

TECHNICAL FIELD

The present disclosure relates to a system and apparatus for charging a locomotive in a charging station, and more particularly, to a system and apparatus for electrical contacts on a locomotive for receiving electrical charge for charging a battery, or batteries, of the locomotive at a charging station.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. Some locomotives may continuously receive electricity to power the locomotives via pantograph contact units contacting the powered cables strung along the rails above the locomotives. Other locomotives may utilize a battery, or batteries, to store electrical charge and to supply power to the locomotives.

PCT Patent Application No. WO2021259283 by Guo, et al. ("the '283 application"), published Dec. 30, 2021, describes communicating position information and remaining power information of a locomotive, and determining the location of a predetermined charging parking space for the locomotive based on the remaining power information. After the locomotive travels to the predetermined charging parking space, a charging controller corresponding to the predetermined charging parking space lowers a charging bow to the locomotive and starts charging the locomotive.

As can be seen from the figures included in the '283 application, a typical charging bow and current receiver utilized by the system described in the '283 application are very small relative to a length of the locomotive that is in need of charge. Accordingly, connecting the charging bow and the current receiver may require a precise alignment. However, the '283 application does not describe system components or a corresponding method for positioning the locomotive at a precise location within the predetermined charging parking space to ensure proper alignment of the charging bow with the current receiver. As a result, even minor deviations in the actual parking location of the locomotive may hinder the charging process. The difficulty in aligning the charging bow with the current receiver using the system set forth in the '283 application may be compounded when multiple coupled locomotives, and thus multiple current receivers, must be aligned with multiple charging bows at a charging station.

The systems and methods described herein are directed to addressing one or more of the drawbacks set forth above.

SUMMARY

According to a first aspect of a charge receiving system, a charge receiving system includes a first charge receiving rail and a second charge receiving rail attached to a roof of a compartment of a locomotive. The first charge receiving rail is disposed at a first angle relative to a center line of the roof in the longitudinal direction of the locomotive and extends beyond a first edge of the roof. The first charge receiving rail is configured to electrically contact a first charging contact of an external charging unit and electrically connect to a first polarity terminal of one or more batteries. The second charge receiving rail is disposed at a second angle relative to the center line of the roof and extends beyond the first edge of the roof. The second charge receiving rail is configured to electrically contact a second charging contact of the external charging unit and electrically connect to a second polarity terminal of the one or more batteries.

According to another aspect, a charging station includes a plurality of charging units disposed along a track for a train in the charging station where the plurality of charging units are spaced apart by a preselected distance. Each charging unit includes a first charging contact having a first polarity and a second charging contact having a second polarity. The first charging contact is configured to electrically contact a first charge receiving rail attached to a roof of a compartment of a locomotive of the train. The first charge receiving rail includes a first removable segment and a first primary segment. The first removable segment is electrically coupled to the first primary segment and extends beyond a first edge of the roof. The first removable segment is removable from the first primary segment and the roof. The second charging contact having a second polarity is configured to electrically contact a second charge receiving rail attached to the roof of the removable compartment of the locomotive of the train. The second charge receiving rail includes a second removable segment and a second primary segment. The second removable segment is electrically coupled to the second primary segment and extends beyond the first edge of the roof. The second removable segment is removable from the second primary segment and the roof. The charging station additionally includes a control center operational to communicate with the train, receive, from the train, information associated with the train, and direct the train to an appropriate parking space in the charging station based on the information.

According to yet another aspect, a charging system includes a charging station with a plurality of charging units disposed along a track for a train in the charging station. The plurality of charging units are spaced apart by a preselected distance. Each charging unit includes a first charging contact having a first polarity and a second charging contact having a second polarity. The charging system also includes a train including at least one locomotive having one or more compartments with a charge receiving system. The charge receiving system includes a first charge receiving rail and a second charge receiving rail. The first charge receiving rail is attached to a roof of the one or more removable compartments at a first angle relative to a center line of the roof in the longitudinal direction of the locomotive and extends beyond a first edge of the roof. The first charge receiving rail electrically contacts the first charging contact and electrically connects to a first polarity terminal of one or more batteries. The second charge receiving rail is attached to the roof at a second angle relative to the center line of the roof and extends beyond the first edge of the roof. The second charge receiving rail electrically contacts the second charging contact and electrically connects to a second polarity terminal of the one or more batteries.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
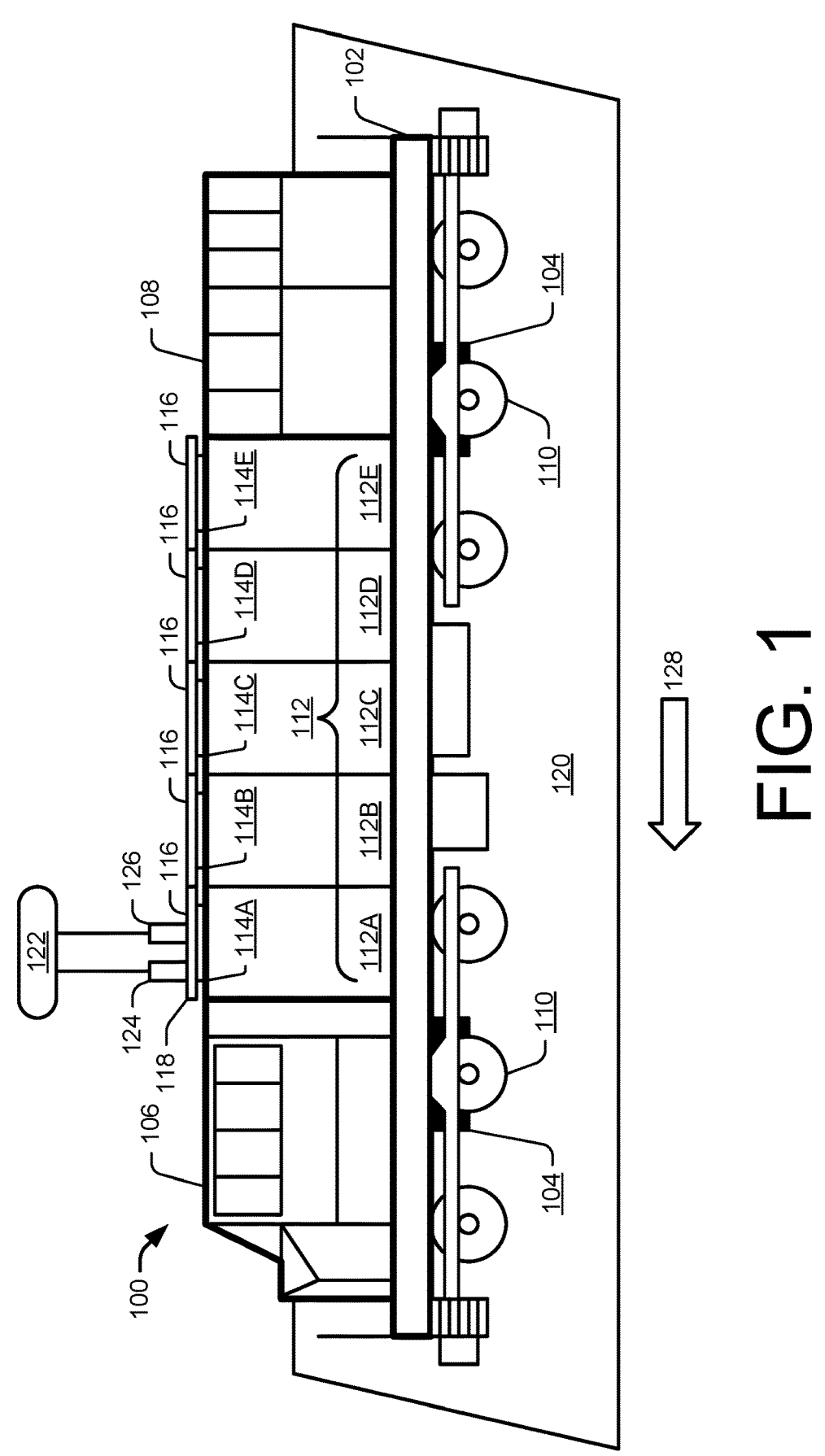
FIG. 1 illustrates a schematic side view of an example locomotive with a charge receiving system.

FIG. 1 illustrates a schematic side view of an example locomotive 100 with a charge receiving system. The locomotive 100 includes a chassis or frame 102 to which traction motors 104, a cab 106, and an end structure 108 are attached. The traction motors 104 are configured to propel the locomotive 100 via active wheels, such as wheels 110. The cab 106 may provide comfort for an operator of the locomotive 100 and/or for protection for control-related devices of the locomotive 100. The end structure 108 may house operation related equipment for the locomotive 100. In some examples, the locomotive 100 may be semi-autonomous or fully autonomous, and able to operate without an onboard or remote operator.

The locomotive 100 also includes one or more compartments that are removable, or removable compartments 112 (five removable compartments 112A, 112B, 112C, 112D, and 112E are shown in this example), which may house batteries or other components. In this example, the removable compartments 112 house batteries for powering the locomotive 100. Each removable compartment, 112A, 112B, 112C, 112D, and 112E, has a corresponding roof, 114A, 114B, 114C, 114D, and 114E, on which a charge receiving systems 116 is disposed. In this example, each charge receiving system 116 is connected to a charge receiving system disposed on adjacent removable compartment(s), and all together form a charge receiving systems 118 on the roofs, 114A, 114B, 114C, 114D, and 114E spanning the length of the removable compartments 112 from the removal compartment 112A to the removal compartment 112E.

When the locomotive 100 is parked at a charging station 120, the locomotive 100 may charge the batteries in the removable compartments 112 by receiving charge from a charging unit 122 via a first charging contact 124 and a second charging contact 126 of the charging unit 122 contacting corresponding areas of the charge receiving system 116. A charging unit, such as the charging unit 122, is normally located along a track in the charging station, on which the locomotive 100 is parked. The first charging contact 124 may be associated with a positive polarity and the second charging contact 126 may be associated with a negative polarity. In this example, the locomotive 100 is shown to have been parked in a first direction as indicated by an arrow 128. Because the charge receiving system 118 spans the length of the removable compartments 112, the parking location of the locomotive 100 may be flexible and vary, and yet, the locomotive 100 is still able to receive charge from the charging unit 122. The locomotive 100 is able to receive charge from the charging unit 122 as long as the locomotive 100 is parked at the charging station 120 within a location where the first charging contact 124 and the second charging contact 126 can contact any point of the corresponding area over the length of the removable compartments 112.

Figure 2:
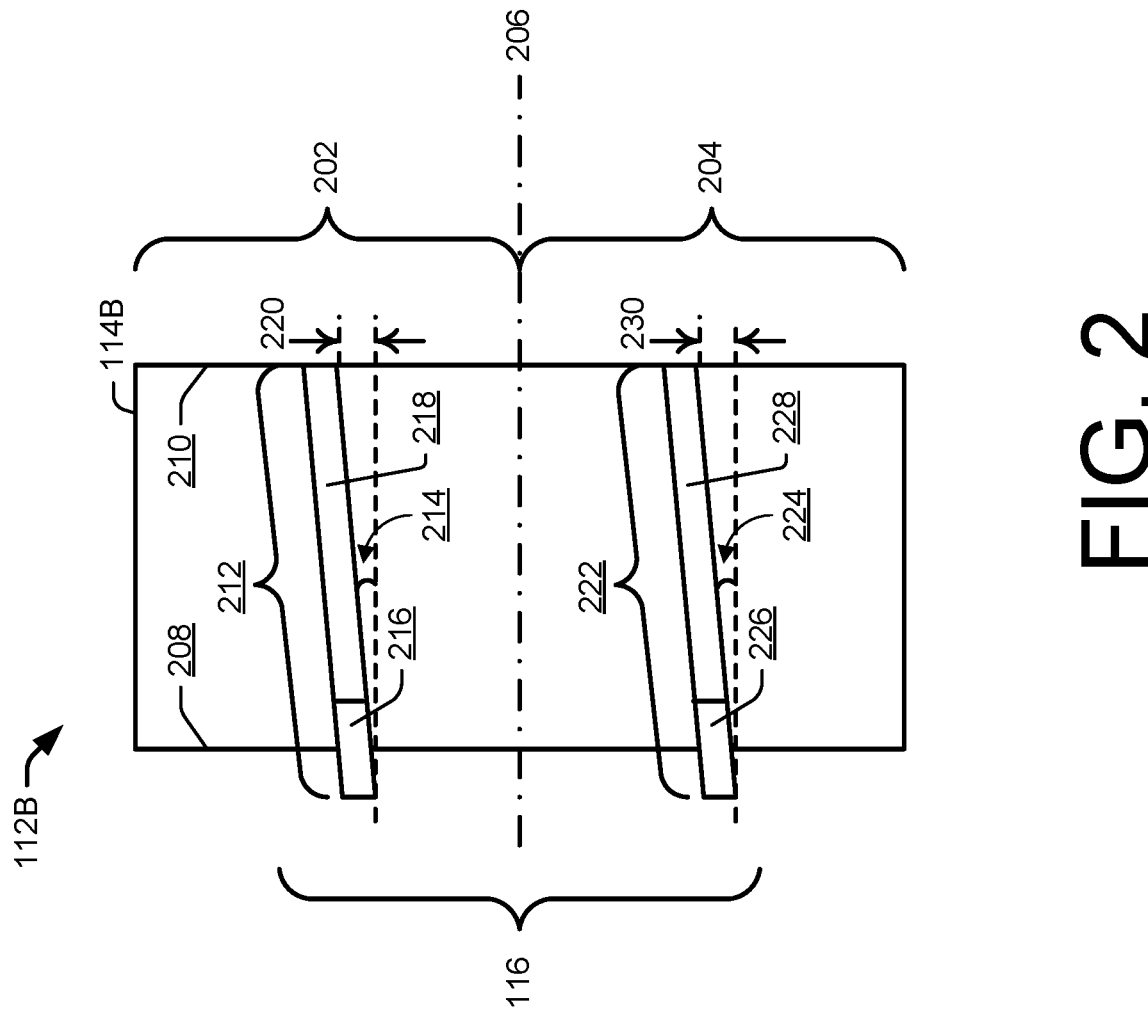
FIG. 2 illustrates a schematic top view of an example removable compartment with a charge receiving system.

FIG. 2 illustrates a schematic top view of an example removable compartment, such as the removable compartment 112B, with the charge receiving system 116. As discussed above with reference to FIG. 1, the removable compartment 112B has the roof 114B, on which the charge receiving system 116 is disposed.

The roof 114B may include a first area 202 and a second areas 204. The first area 202 and the second areas 204 may be separated by a center line 206 of the roof 114B in the longitudinal direction of the locomotive 100. The roof 114B also includes a first edge 208 and a second edge 210 disposed opposite the first edge 208. The charge receiving system 116 may comprise a first charge receiving rail 212 disposed in the first area 202 and secured to the roof 114B at a first angle 214 relative to the center line 206. The first charge receiving rail 212 may be configured to electrically contact a first charging contact, for example having a positive polarity, of an external charging unit, such as the first charging contact 124 of the charging unit 122. The first charge receiving rail 212 may electrically connect to a first polarity terminal (a positive polarity) of one or more batteries in the removable compartment 112B. The first charge receiving rail 212 may comprise a first removable segment 216 extending beyond the first edge 208 of the roof 114B, and a first primary segment 218 electrically coupled to the first removable segment 216. The first removable segment 216 may be configured to electrically connect to a first primary segment 218 of an adjacent removable compartment, such as the removable compartment 112A, and to be removable from the first primary segment 218 and the roof 114B. The first charge receiving rail 212 has a first length (a combined length of the first removable segment 216 and the first primary segment 218) and the first angle 214 is set to cover a first predetermined width 220 over the first length. The first predetermined width 220 may be greater than or equal to a width of the first charge receiving rail 212 such that the first removable segment 216 is aligned side-by side with the first primary segment 218 of the adjacent removable compartment. The first predetermined width 220 may also be less than or equal to a width of the first charging contact 124 such that the first charging contact 124 and the first charge receiving rail 212 are able to stay in contact over the length of the removable compartment 112B.

The charge receiving system 116 may additionally comprise a second charge receiving rail 222 disposed in the second area 204 and secured to the roof 114B at a second angle 224 relative to the center line 206. The second charge receiving rail 222 may be configured to electrically contact a second charging contact, for example having a negative polarity, of an external charging unit, such as the second charging contact 126 of the charging unit 122. The second charge receiving rail 222 may electrically connect to a second polarity terminal (a negative polarity) of one or more batteries in the removable compartment 112B. The second charge receiving rail 222 may comprise a second removable segment 226 extending beyond the first edge 208 of the roof 114B and a second primary segment 228 electrically coupled to the second removable segment 226. The second removable segment 226 may be configured to electrically connect to a second primary segment 228 of the adjacent removable compartment 112A, and to be removable from the second primary segment 228 and the roof 114B. The second charge receiving rail 222 has a second length (a combined length of the second removable segment 226 and the second primary segment 228) and the second angle 224 is set to cover a second predetermined width 230 over the second length. The second predetermined width 230 may be greater than or equal to a width of the second charge receiving rail 222 such that the second removable segment 226 is aligned side-by-side with the second primary segment 228 of the adjacent removable compartment. The second predetermined width 230 may also be less than or equal to a width of the second charging contact 126 such that the second charging contact 126 and the second charge receiving rail 222 are able to stay in contact over the length of the removable compartment 112B.

Figure 3:
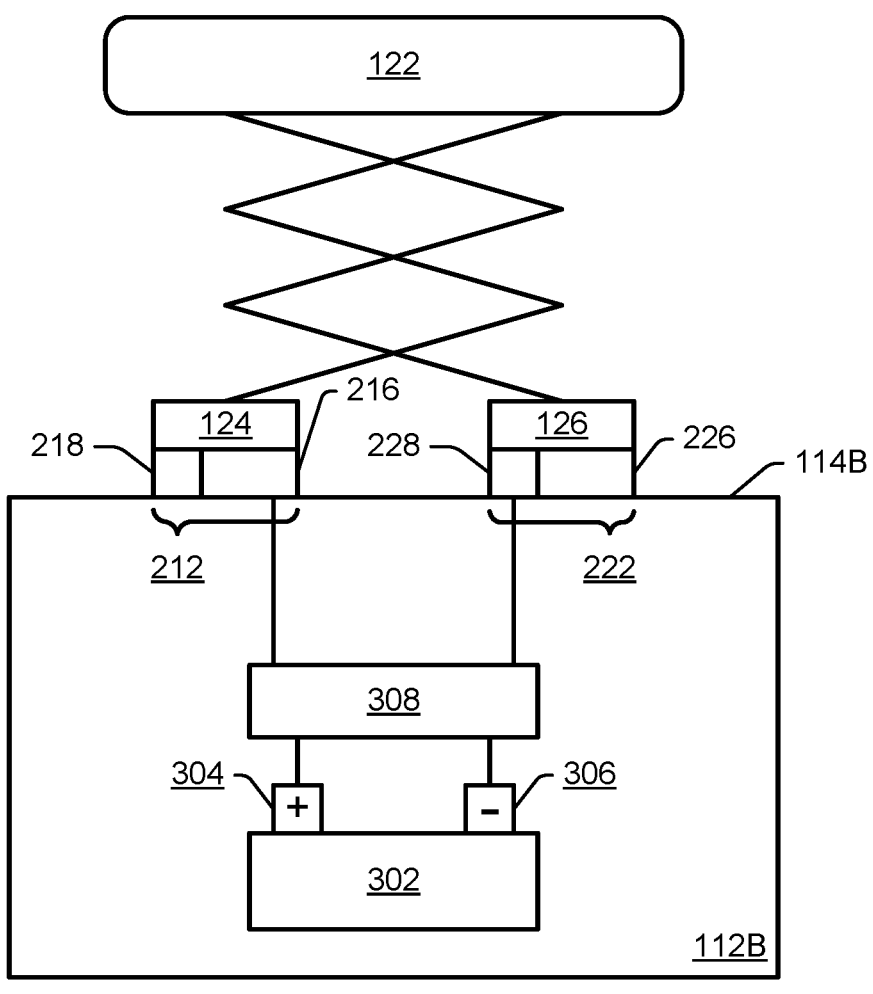
FIG. 3 illustrates a schematic front view of the removable compartment with a charging unit.

FIG. 3 illustrates a schematic front view of the removable compartment 112B with the charging unit 122. As the charging unit 122 extends the first charging contact 124 and the second charging contact 126, the first charging contact 124 contacts the first charge receiving rail 212 and the second charging contact 126 contacts the second charge receiving rail 222. To protect batteries 302 in the removable compartment 112B, the first charge receiving rail 212 and second charge receiving rail 222 may be electrically connected to the first polarity terminal 304 (a positive polarity) and the second polarity terminal 306 (a negative polarity) through a battery protection circuit 308. The battery protection circuit 308 automatically connects the first charge receiving rail 212 and second charge receiving rail 222 to appropriate terminals of the batteries 302 based on the polarity applied to each of the first charge receiving rail 212 and the second charge receiving rail 222. In this example, the first charge receiving rail 212 contacts the first charging contact 124 (positive polarity) and the second charge receiving rail 222 contacts the second charging contact 126 (negative polarity). Based on the condition above, the battery protection circuit 308 connects the first charge receiving rail 212 to the first polarity terminal 304 and connects the second charge receiving rail 222 to the second polarity terminal 306.

Figure 4:
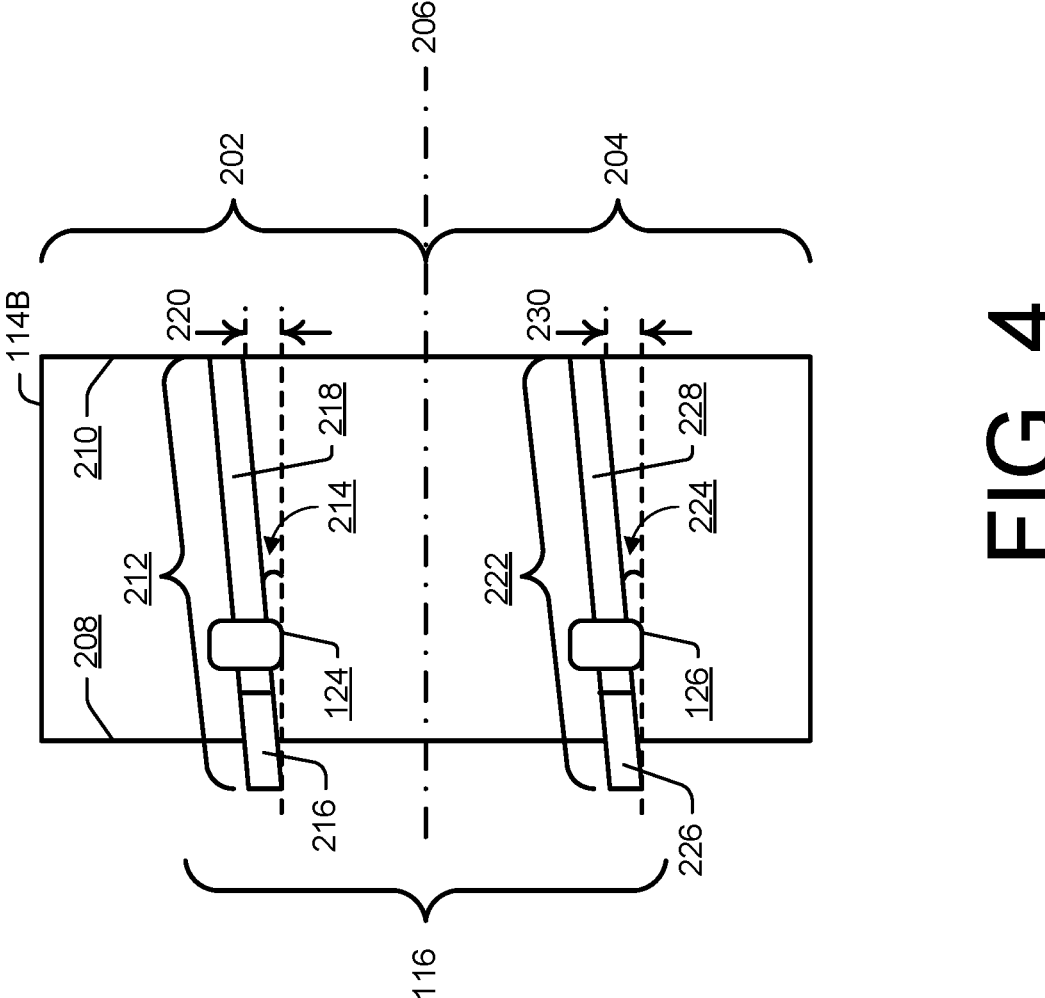
FIG. 4 illustrates a schematic top view of the removable compartment with first and second charging contacts contacting first and second charge receiving rails.
Figure 4:
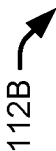

FIG. 4 illustrates a schematic top view of the removable compartment 112B with the first charging contact 124 contacting the first charge receiving rail 212 and the second charging contact 126 contacting the second charge receiving rail 222. As discussed above with reference to FIG. 2, the first angle 214 and the second angle 224 are set such that the first charging contact 124 and the second charging contact 126 are able to stay in contact with the first charge receiving rail 212 and the second charge receiving rail 222, respectively, over the length of the removable compartment 112B.

Figure 5:
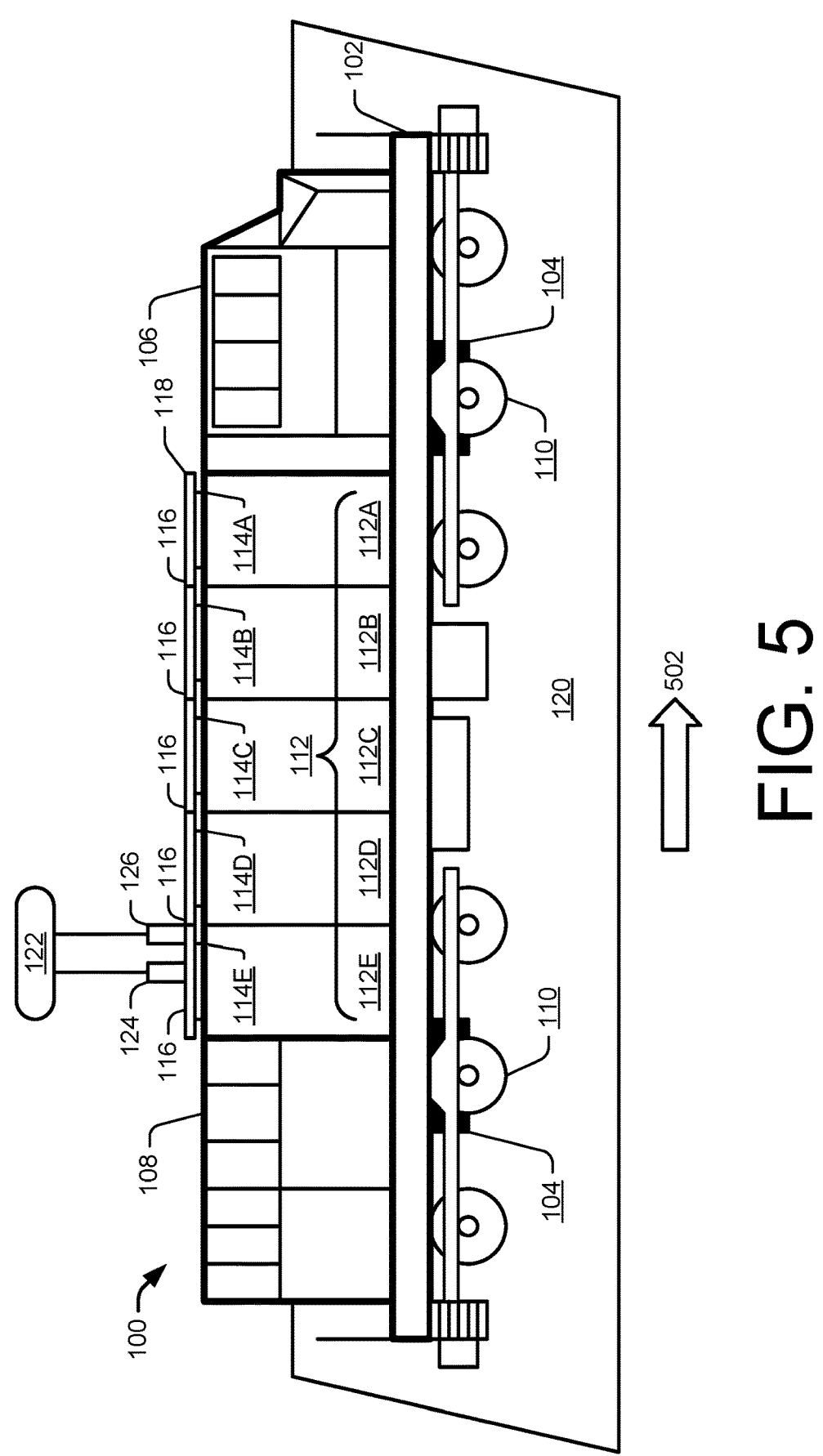
FIG. 5 illustrates a schematic side view of another example locomotive with a charge receiving system.

FIG. 5 illustrates a schematic side view of the locomotive 100 with the charge receiving system 118 parked facing the opposite direction compared to the locomotive 100 of FIG. 1. While the charging station 120 is stationary and the orientation of the charging unit 122 is fixed relative to the charging station 120, the locomotive 100 may come into the charging station from a different direction and/or be parked facing the opposite direction compared to the direction shown in FIG. 1. Because the locomotive 100 is parked at the charging station 120 facing the opposite direction compared to FIG. 1 as indicated by an arrow 502, the first charging contact 124 contacts the second charge receiving rail 222 and the second charging contact 126 contacts the first charge receiving rail 212.

Figure 6:
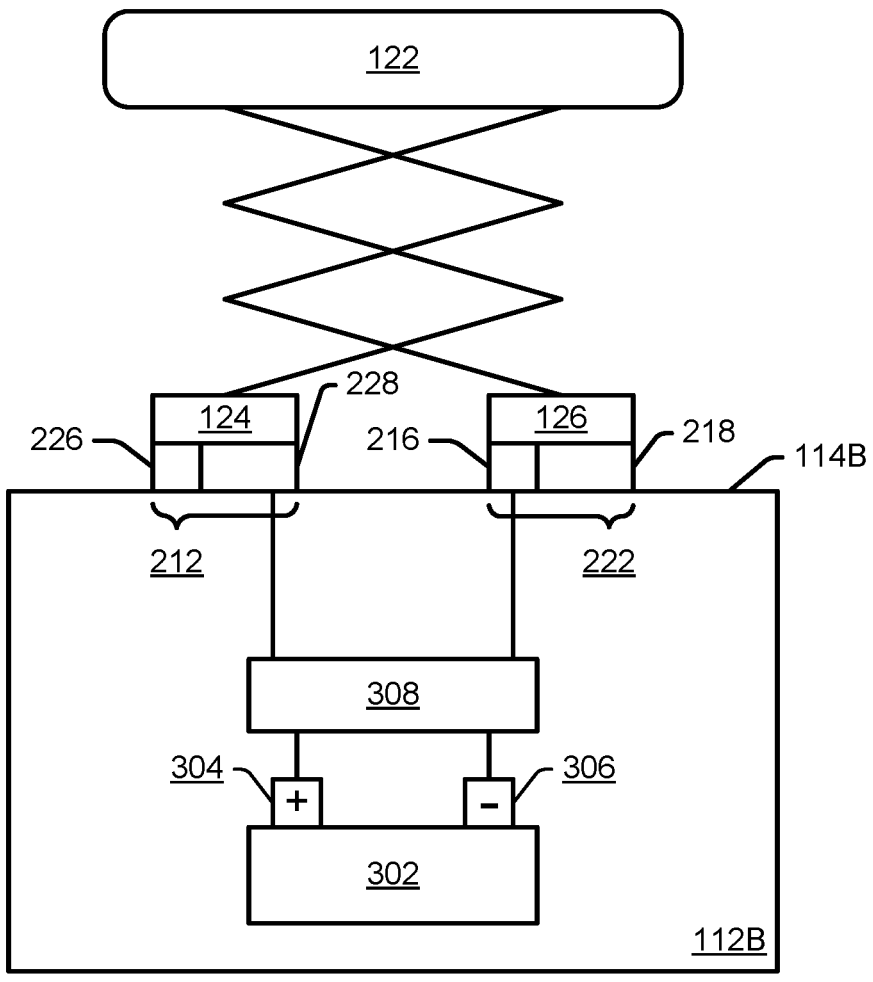
FIG. 6 illustrates a schematic front view of the example locomotive illustrated in FIG. 5, a removable compartment, and a charging unit.

FIG. 6 illustrates a schematic front view of the removable compartment 112B with the charging unit 122 when the locomotive 100 is parked facing the opposite direction compared to the locomotive 100 of FIG. 1. As the charging unit 122 extends the first charging contact 124 and the second charging contact 126, the first charging contact 124 contacts the second charge receiving rail 222 and the second charging contact 126 contacts the first charge receiving rail 212. While the polarities at the first charge receiving rail 212 and second charge receiving rail 222 are reversed compared to the previous environment described above with reference to FIG. 3, the batteries 302 are automatically connected appropriately through the battery protection circuit 308 as described above with reference to FIG. 3. In this example, the first charge receiving rail 212 contacts the second charging contact 126 (negative polarity) and the second charge receiving rail 222 contacts the first charging contact 124 (positive polarity). Based on the condition above, the battery protection circuit 308 connects the first charge receiving rail 212 to the second polarity terminal 306 and connects the second charge receiving rail 222 to the first polarity terminal 304.

To accommodate the opposite polarity condition, the first charge receiving rail 212 of the charge receiving system 118 may be further configured to electrically contact the second charging contact 126 of the external charging unit 122 and automatically connect to the second polarity terminal of the one or more batteries. Similarly, the second charge receiving rail 222 of the charge receiving system 118 may be further configured to electrically contact the first charging contact 124 of the external charging unit 122 and automatically connect to the first polarity terminal of the one or more batteries. To achieve this symmetrical contact conditions, the lengths of the first charge receiving rail 212 and the second charge receiving rail 222 may be set to be equal and the first charge receiving rail 212 and the second charge receiving rail 222 may be arranged to be paralleled to each other. That is, the first angle 214 is equal to the second angle 224, and the first predetermined width 220 is equal to the second predetermined width 230.

Figure 7:
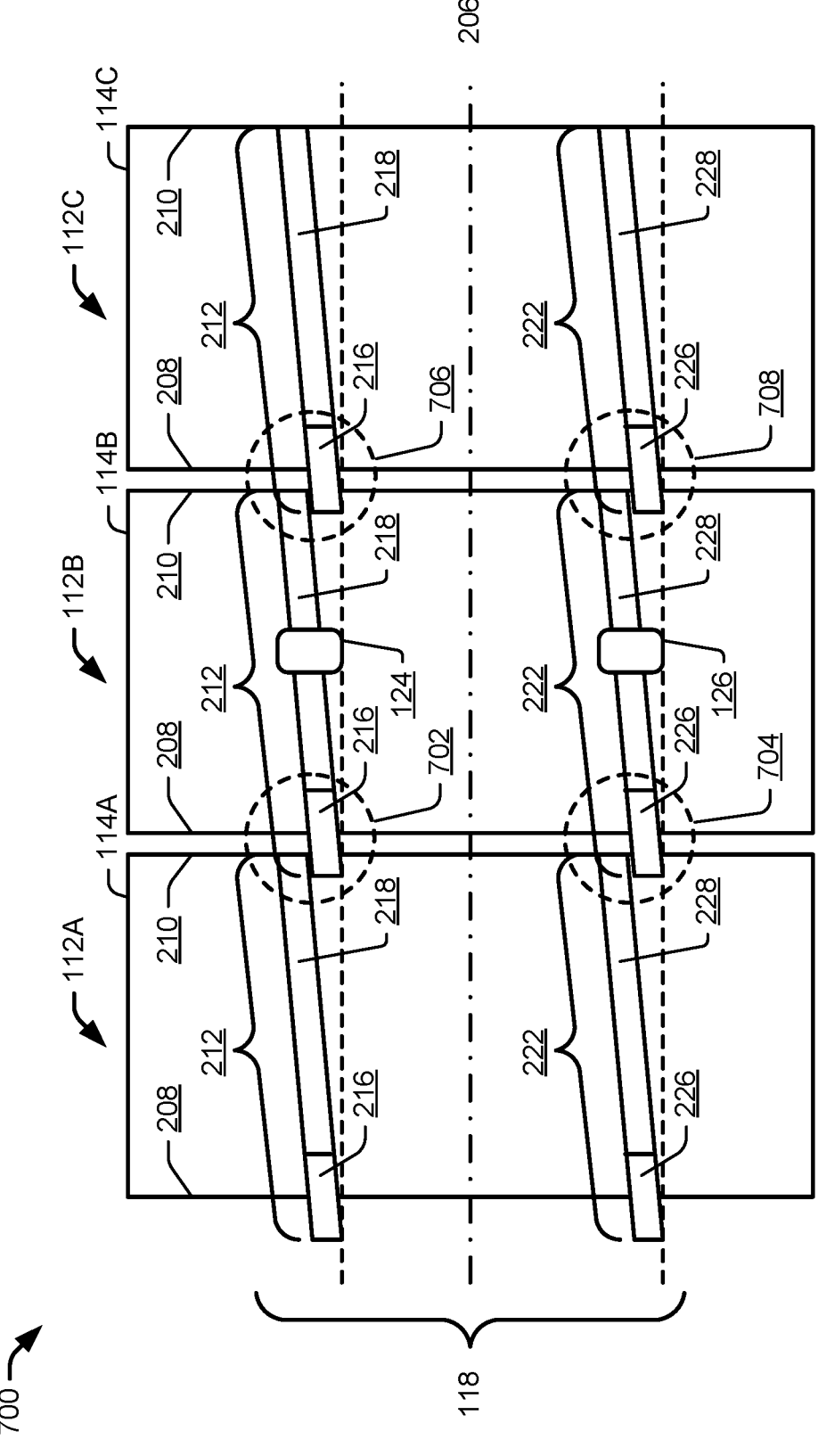
FIG. 7 illustrates a schematic top view of three adjacent removable compartments with the charge receiving system.

FIG. 7 illustrates a schematic top view 700 of three adjacent removable compartments, 112A, 112B, and 112C with the corresponding charge receiving systems 116 connected to form the charge receiving system 118 and the first charging contact 124 and the second charging contact 126. As discussed above with reference to FIG. 2, the first removable segment and the second removable segment of one removable compartment are connected to the first primary segment and the second primary segment of the adjacent removable compartment.

For example, the first removable segment 216 of the removable compartment 112B is connected to the first primary segment 218 of the removable compartment 112A adjacent to the removable compartment 112B as indicated by a circle 702. Similarly, the second removable segment 226 of the removable compartment 112B is connected to the second primary segment 228 of the removable compartment 112A as indicated by a circle 704. The first removable segment 216 of the removable compartment 112C is also connected to the first primary segment 218 of the removable compartment 112B as indicated by a circle 706, and the second removable segment 226 of the removable compartment 112C is connected to the second primary segment 228 of the removable compartment 112B as indicated by a circle 708. As discussed above with regard to FIG. 4, the first charging contact 124 and the second charging contact 126 are able to stay in contact with the first charge receiving rail 212 and the second charge receiving rail 222, respectively, over the length of the removable compartment 112B. In the cascaded configuration shown in FIG. 7, the first charging contact 124 and the second charging contact 126 are able to stay in contact with the first charge receiving rail 212 and the second charge receiving rail 222, respectively, over the entire length of the removable compartments 112.

Additionally, when any removable compartment needs to be removed, for example, for maintenance or repair, the entire charge receiving system 118 need not be disassembled. Only the first removable segment 216 and the second removable segment 226 of the removable compartment to be removed and the first removable segment 216 and the second removable segment 226 of the adjacent removable compartment need to be disassembled to disconnect the removable compartment to be removed.

Figure 8:
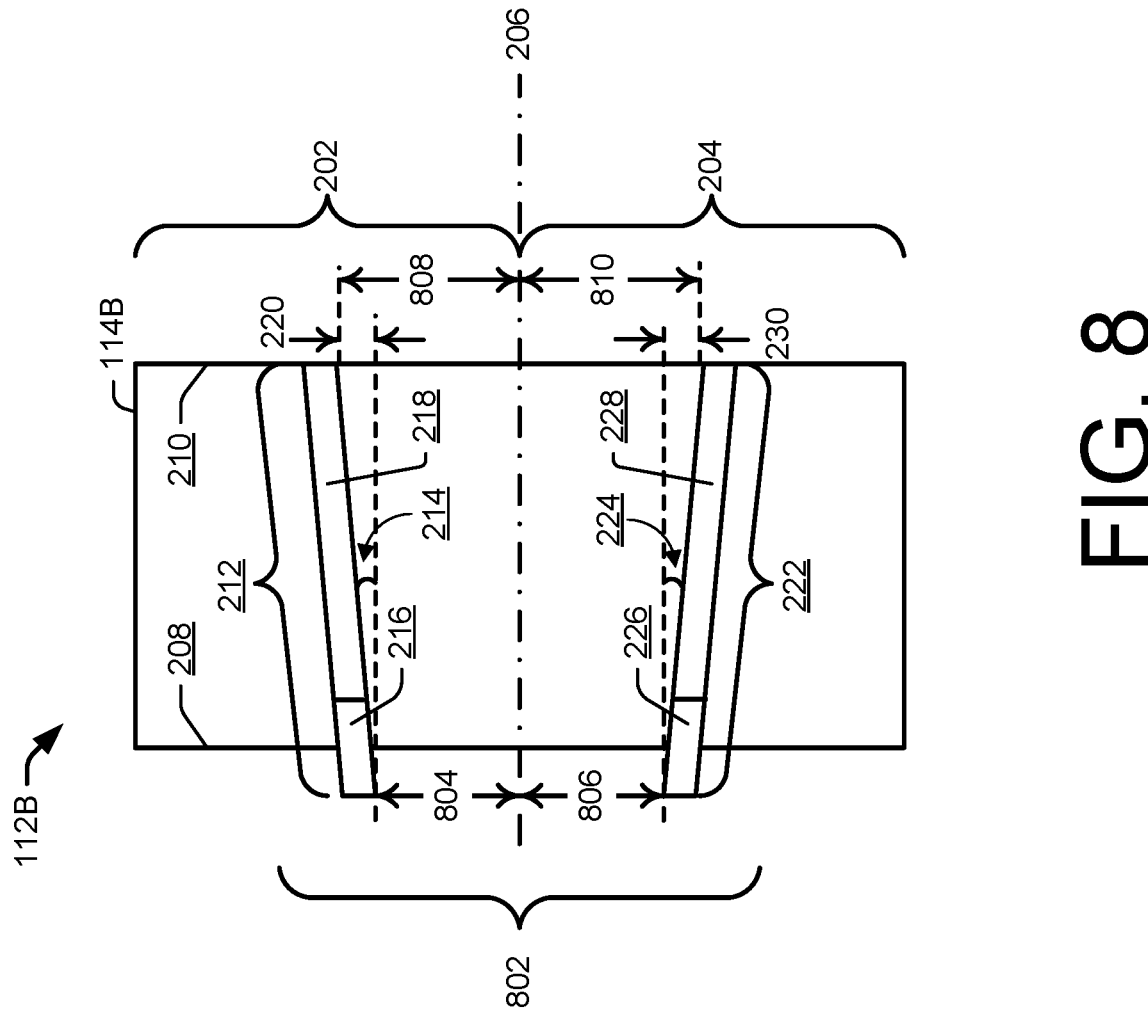
FIG. 8 illustrates a schematic top view of another example removable compartment with a charge receiving system.

FIG. 8 illustrates a schematic top view of an example removable compartment, such as the removable compartment 112B, with a charge receiving system 802 having a different configuration from the charge receiving system 116. As discussed above with reference to FIGS. 1 and 2, the charge receiving system 802 is illustrated as disposed on the roof 114B of the removable compartment 112B.

In this configuration, the first charge receiving rail 212 is disposed in the same way as described in reference to FIG. 2. However, the second charge receiving rail 222 of the charge receiving system 802 is disposed in the second area 204 symmetrically about the center line 206 instead of being parallel to the first charge receiving rail 212. That is, as with the charge receiving system 116, the first length of the first charge receiving rail 212 is equal to the second length of the second charge receiving rail 222, the first charge receiving rail 212 and the second charge receiving rail 222 are disposed equidistant from the center line 206, and the first predetermined width 220 is equal to the second predetermined width 230. The distance 804 from the center line 206 to the tip of the first removable segment 216 is equal to the distance 806 from the center line 206 to the tip of the second removable segment 226. The distance 808 from the center line 206 to the end of the first primary segment 218 is equal to the distance 810 from the center line 206 to the end of the second primary segment 228.

Figure 9:
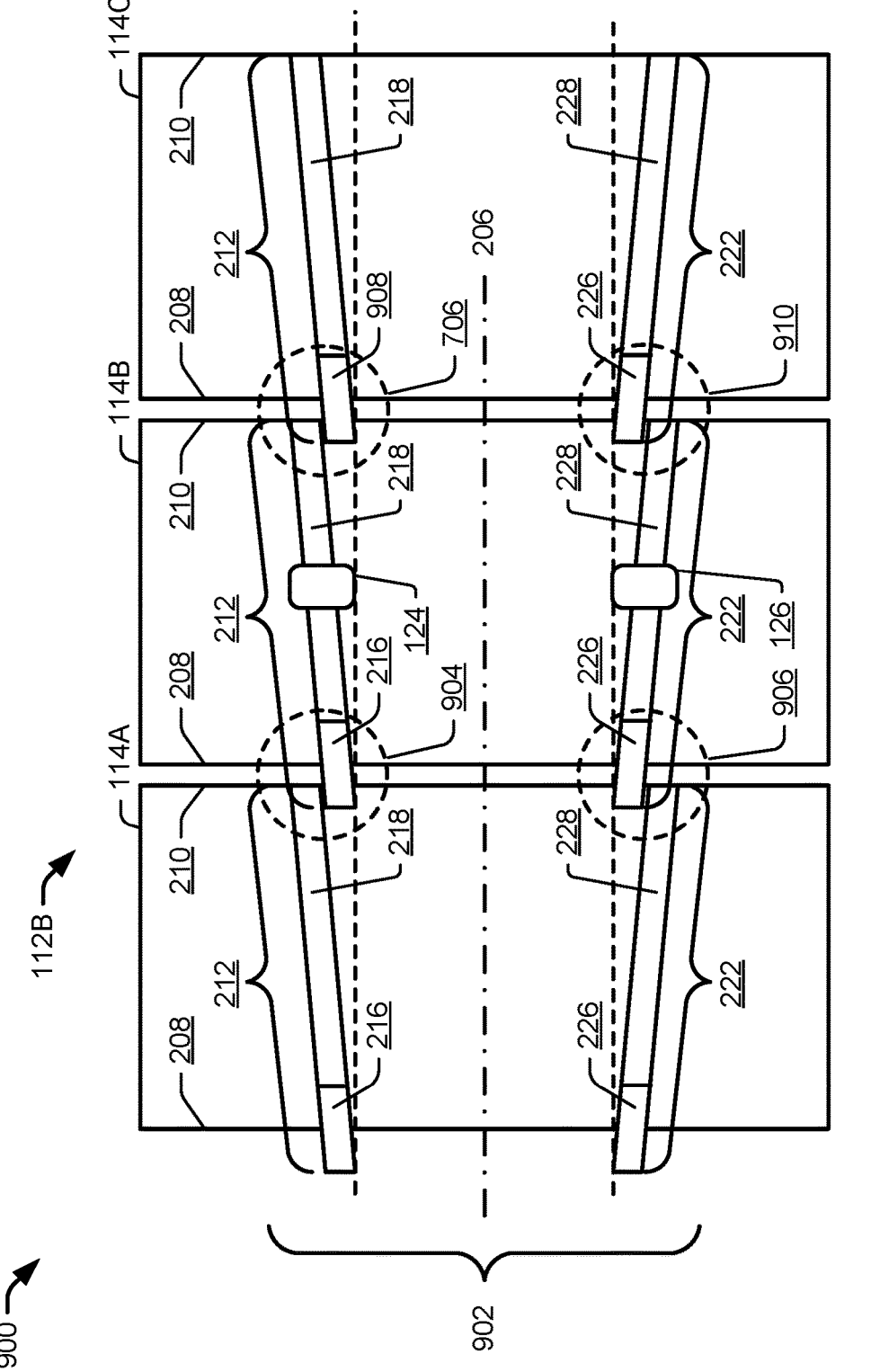
FIG. 9 illustrates a schematic top view of three adjacent removable compartments with the charge receiving system of FIG. 8.

FIG. 9 illustrates a schematic top view 900 of three adjacent removable compartments, 112A, 112B, and 112C with the corresponding charge receiving systems 802 connected to form the charge receiving system 902 and the first charging contact 124 and the second charging contact 126. As discussed above with reference to FIG. 7, the first removable segment and the second removable segment of one removable compartment are connected to the first primary segment and the second primary segment of the adjacent removable compartment. Such connections between the charge receiving system 802 of the removable compartments 112A, 112B, and 112C are indicated by circles 904, 906, 908, and 910. Similar to FIG. 7, the first charging contact 124 and the second charging contact 126 are able to stay in contact with the first charge receiving rail 212 and the second charge receiving rail 222, respectively, over the length of the removable compartment 112B. In the cascaded configuration shown in FIG. 9, the first charging contact 124 and the second charging contact 126 are able to stay in contact with the first charge receiving rail 212 and the second charge receiving rail 222, respectively, over the entire length of the removable compartments 112. Additionally, when any removable compartment needs to be removed, for example, for maintenance or repair, the entire charge receiving system 118 need not be disassembled. Only the first removable segment 216 and the second removable segment 226 of the removable compartment to be removed and the first removable segment 216 and the second removable segment 226 of the adjacent removable compartment need to be disassembled to disconnect the removable compartment to be removed.

Figure 10:
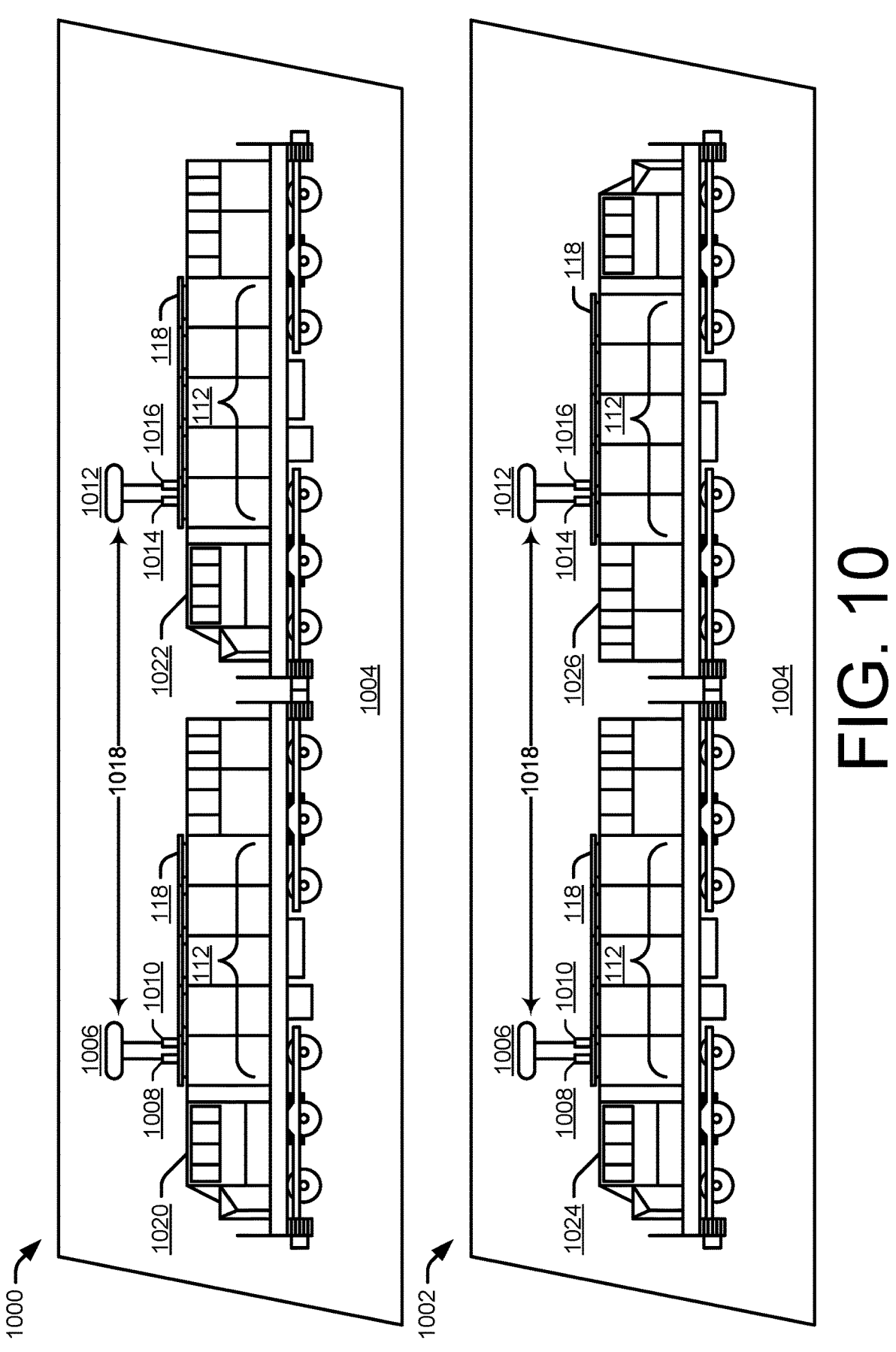
FIG. 10 illustrates schematic diagrams of a charging station utilized for trains with two coupled locomotives in various orientations.

Flexibility in the parking location of a locomotive for charging batteries of the locomotive may also be applicable to multiple coupled locomotives. FIG. 10 illustrates schematic diagrams 1000 and 1002 of a charging station 1004 utilized for two locomotives that are coupled differently. The charging station 1004 has two charging units: a first charging unit 1006 with a first charging contact 1008 having a positive polarity and the second charging contact 1010 having a negative polarity, and a second charging unit 1012 with a first charging contact 1014 having a positive polarity and a second charging contact 1016 having a negative polarity. The first charging unit 1006 and the second charging unit 1012 are fixed apart by a preselected distance 1018 that is compatible with two coupled locomotives.

In the diagram 1000, two locomotives 1020 and 1022 are coupled and are facing in the same direction. When two locomotives 1020 and 1022 are parked in the charging station 1004 for charging the batteries of the locomotives 1020 and 1022, a relative location of the first charging unit 1006 with the locomotive 1020 is about the same as that of the second charging unit 1012 with the locomotive 1022. That is, each charging unit is approximately above the first removable compartment of the corresponding locomotive. The first charging contact 1008 and the second charging contact 1010 of the first charging unit 1006 respectively contact the first charge receiving rail 212 and the second charge receiving rail 222 of the charge receiving system 118 of the locomotive 1020. Similarly, the first charging contact 1014 and the second charging contact 1016 of the second charging unit 1012 respectively contact the first charge receiving rail 212 and the second charge receiving rail 222 of the charge receiving system 118 of the locomotive 1022.

In the diagram 1002, two locomotives 1024 and 1026 are coupled but are facing in the opposite directions, and are parked in the charging station 1004. The location of the first charge unit 1006 relative to the locomotive 1024 is the same as, or similar to, the location relative to the locomotive 1020. However, the location of the second charge unit 1012 relative to the locomotive 1026 is different from the location relative to the locomotive 1022 because the locomotive 1026 is facing the opposite direction compared to the locomotive 1022. Because the charge receiving system 118 of the locomotive 1026 spans the length of the removable compartments 112, the first charging contact 1014 and the second charging contact 1016 of the second charging unit 1012 are able to respectively contact the second charge receiving rail 222 and the first charge receiving rail 212 of the charge receiving system 118 of the locomotive 1026. This polarity switch is automatically managed as discussed above with reference to FIG. 6.

Figure 11:
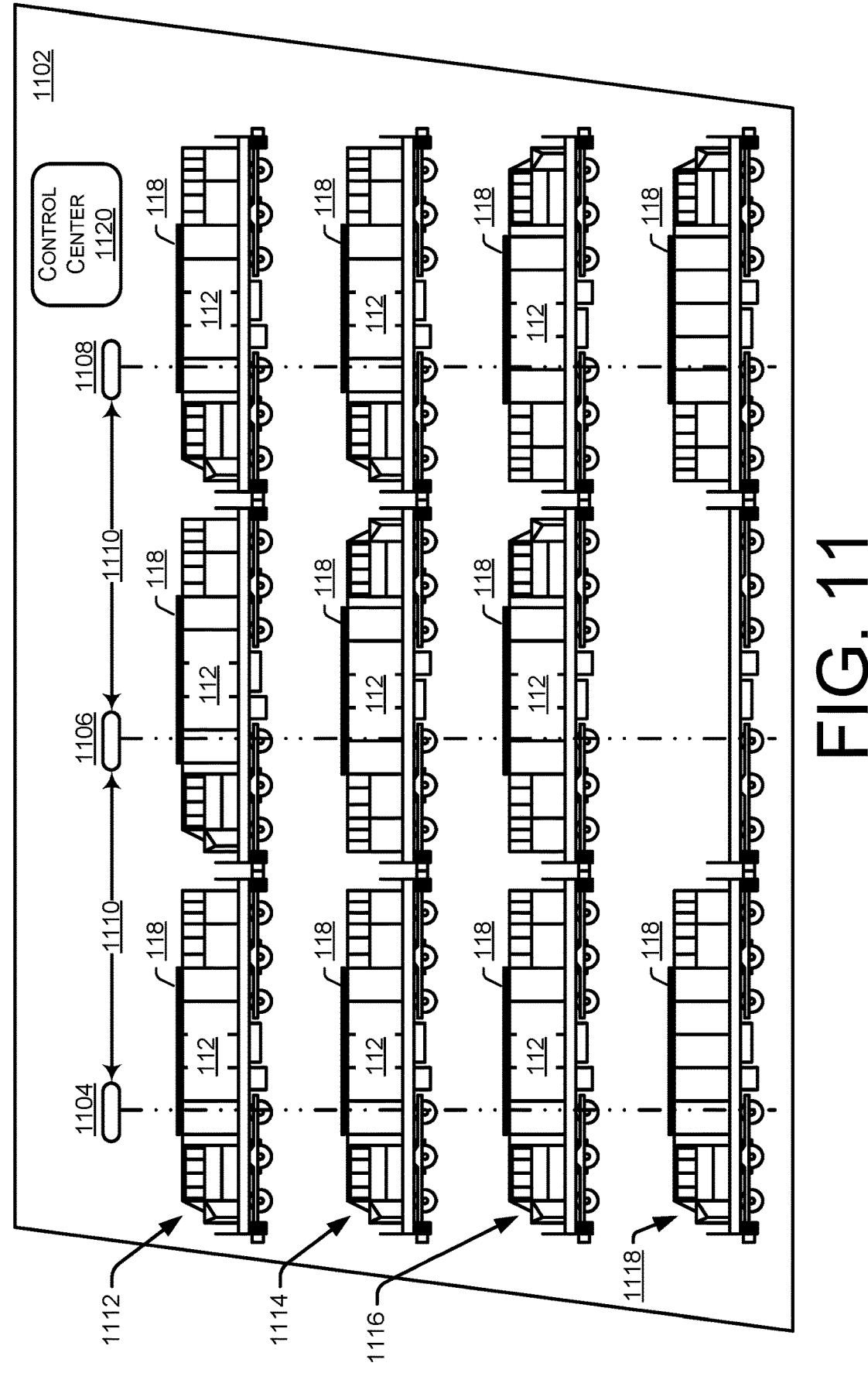
FIG. 11 illustrates example trains including three coupled units in various orientations parked in a charging station.

FIG. 11 illustrates example trains including three coupled units in various arrangements in parked positions in a charging station 1102. The charging station 1102 is show to include three charging units 1104, 1106, and 1108 separated by a preselected distance 1110.

The train 1112 includes three locomotives coupled in the same direction; the train 1114 includes three coupled locomotives with the first and third locomotives facing in one direction and the second locomotive facing in the opposite direction; the train 1116 include three coupled locomotives with the first locomotive facing in one direction and the second and third locomotives facing the opposite direction; and the train 1118 includes two locomotives at the opposite ends facing in opposite directions with a cargo car between them. While the trains 1112, 1114, 1116, and 1118 have different unit arrangements, the charging units 1104, 1106, and 1108 are position above the charge receiving system 118 of the corresponding locomotives and are able to charge the batteries of the locomotives.

The charging station 1102 may include a control center 1120, which may establish communication with the train in the charging station 1102, for example via a WiFi commu-nication system or any other appropriate communication systems, and control the charging units 1104, 1106, and 1108. For example, the train 1112 may communicate with the control center 1120 and provide the control center 1120 with the identification and information associated with the train 1112 such as types and/or models of cars in the train 1112 and how those cars are arranged in the train 1112. In response, the control center 1120 may direct to an appro-priate parking space for the train 1112. For example, the train 1112 may notify the control center 1120 that the train 1112 comprises three coupled locomotives facing in the same direction. In response, the control center 1120 may direct the train 1112 to an appropriate parking location in the charging station having three charging units, such as the charging units 1104, 1106, and 1108. The train 1112 may further notify the control center 1120 that only the first and second locomotives need to be charged, and the control center 1120 may, in response, only active the charging units 1104 and 1106. For another example, the train 1118 may communicate with the control center 1120 and notify the control center 1120 that the second unit is a cargo car, and the control center 1120 may, understating that the cargo car does not need to be charged, activate only the charging units 1104 and 1108. While trains with three units are discussed above, a number of the charging stations may be increased and the charging stations may be spaced differently to accommodate various locomotive and cargo car combinations.

INDUSTRIAL APPLICABILITY

The example systems of the present disclosure are appli-cable to a variety of electrical machines, such as, for example, an electric locomotive, an electric automobile, an electric bus, an electric agricultural vehicle, an electric paving machine, an electric mining machine, and/or electric construction vehicles. The systems described herein may be used in association with charging electric vehicles. For example, a charge receiving system includes a first charge receiving rail and a second charge receiving rail attached to a roof of a removable compartment for a locomotive. The first charge receiving rail is attached to the roof at a first angle relative to a center line of roof in the longitudinal direction of the locomotive and includes a first removable segment and a first primary segment where the first remov-able segment is electrically coupled to the first primary segment, extends beyond the first edge of the roof, electri-cally connects to a first primary segment of an adjacent removable compartment, and is removable from the first primary segment and the roof. The first charge receiving rail electrically contacts a first charging contact of an external charging unit and electrically connects to a first polarity terminal of one or more batteries. The second charge receiving rail is attached to the roof at a second angle relative to the center line of the roof and includes a second removable segment and a second primary segment where the second removable segment is electrically coupled to the second primary segment, extends beyond the first edge of the roof, electrically connects to a second primary segment of an adjacent removable compartment, and is removable from the second primary segment and the roof. The second charge receiving rail electrically contacts a second charging contact of an external charging unit and electrically connects to a second polarity terminal of one or more batteries.

Because individual charge receiving systems are con-nected to each other when a plurality of removable com-partments are placed in a cascaded configuration, available location for receiving charge spans the length of the entire removable compartments. Thus, the parking location of the locomotive to be charge may be flexible and the locomotive is still able to receive charge from the charging unit. Addi-tionally, when any removable compartment needs to be removed, for example, for maintenance or repair, the entire charge receiving system need not be disassembled. Only the first removable segment and the second removable segment of the removable compartment to be removed and the first removable segment and the second removable segment of the adjacent removable compartment need to be disas-sembled to disconnect the removable compartment to be removed.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the inven-tion (especially in the context of the following claims) are to be construed to cover both the singular and the plural, unless otherwise indicated herein or clearly contradicted by con-text. The use of the term "at least one" followed by a list of one or more items (for example, "at least one of A and B" or one or more of A and B") is to be construed to mean one item selected from the listed items (A or B) or any combi-nation of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been par-ticularly shown and described with reference to the examples above, it will be understood by those skilled in the art that various additional embodiments may be contem-plated by the modification of the disclosed devices, systems, and methods without departing from the spirit and scope of what is disclosed. Such embodiments should be understood to fall within the scope of the present disclosure as deter-mined based upon the claims and any equivalents thereof.

What is claimed is:

1. A charge receiving system, comprising:
   a first charge receiving rail attached to a roof of a compartment of a locomotive at a first angle relative to a center line of the roof in a longitudinal direction of the locomotive, the first charge receiving rail comprising a first removable segment and a first primary segment, the first removable segment electrically coupled to the first primary segment and extending beyond a first edge of the roof, wherein:

the first charge receiving rail is configured to electrically connect to a first charging contact of an external charging unit and to a first polarity terminal of one or more batteries, and the first removable segment is removable from the first primary segment and the roof, the first removable segment being configured to electrically connect to a first primary segment of an adjacent compartment adjacent to the compartment; and a second charge receiving rail attached to the roof at a second angle relative to the center line of the roof, the second charge receiving rail comprising a second removable segment and a second primary segment, the second removable segment electrically coupled to the second primary segment and extending beyond the first edge of the roof, wherein:

the second charge receiving rail is configured to electrically connect to a second charging contact of the external charging unit and to a second polarity terminal of the one or more batteries, and the second removable segment is removable from the second primary segment and the roof, the second removable segment being configured to electrically connect to a second primary segment of the adjacent compartment.

2. The charge receiving system of claim 1, wherein:
the first charge receiving rail is further configured to:
electrically contact the second charging contact of the external charging unit, and
electrically connect to the second polarity terminal of the one or more batteries; and
the second charge receiving rail is further configured to:
electrically contact the first charging contact of the external charging unit, and
electrically connect to the first polarity terminal of the one or more batteries.

3. The charge receiving system of claim 2, wherein:
the roof comprises a first area and a second area separated by a center line of the roof,
the first charge receiving rail is disposed in the first area, and
the second charge receiving rail is disposed in the second area.

4. The charge receiving system of claim 3, wherein:
the first charge receiving rail has a first length and the first angle is selected to span a first predetermined width over the first length, and
the second charge receiving rail has a second length and the second angle is selected to span a second predetermined width over the second length.

5. The charge receiving system of claim 4, wherein:
the first predetermined width is greater than or equal to a width of the first charge receiving rail, and
the second predetermined width is greater than or equal to a width of the second charge receiving rail.

6. The charge receiving system of claim 4, wherein:
the first predetermined width is less than or equal to a width of the first charging contact, and
the second predetermined width is less than or equal to a width of the second charging contact.

7. The charge receiving system of claim 4, wherein:
the first length is equal to the second length,
the first charge receiving rail is disposed parallel to the second charge receiving rail, and
the first predetermined width is equal to the second predetermined width.

8. The charge receiving system of claim 4, wherein:
the first length is equal to the second length,
the first charge receiving rail and the second charge receiving rail are disposed equidistant from the center line, and
the first predetermined width is equal to the second predetermined width.

9. A charging station comprising:
a plurality of charging units disposed along a track for a train in the charging station, the plurality of charging units spaced apart by a preselected distance, each charging unit comprising:
a first charging contact having a first polarity configured to:
electrically contact a first charge receiving rail attached to a roof of a compartment of a locomotive of the train, the first charge receiving rail comprising a first removable segment and a first primary segment, the first removable segment electrically coupled to the first primary segment and extending beyond a first edge of the roof, the first removable segment being removable from the first primary segment and the roof, and
a second charging contact having a second polarity configured to:
electrically contact a second charge receiving rail attached to the roof of the compartment of the locomotive of the train, the second charge receiving rail comprising a second removable segment and a second primary segment, the second removable segment electrically coupled to the second primary segment and extending beyond the first edge of the roof, the second removable segment being removable from the second primary segment and the roof; and
a control center operational to:
communicate with the train,
receive, from the train, information associated with the train, and
direct the train to an appropriate parking space in the charging station based on the information.

10. The charging station of claim 9, wherein the control center is further operational to activate one or more charging units of the plurality of charging units based on the information.

11. A charging system comprising:
a charging station including a plurality of charging units disposed along a track for a train in the charging station, the plurality of charging units spaced apart with a preselected distance, each charging unit comprising:
a first charging contact having a first polarity, and
a second charging contact having a second polarity; and
a train comprising at least one locomotive, the at least one locomotive including one or more compartments having a charge receiving system, the charge receiving system comprising:
a first charge receiving rail attached to a roof of the one or more compartments at a first angle relative to a center line of the roof in a longitudinal direction of the locomotive, the first charge receiving rail comprising a first removable segment and a first primary segment, the first removable segment electrically coupled to the first primary segment and extending beyond a first edge of the roof, wherein:
the first charge receiving rail is configured to electrically connect to the first charging contact and to a first polarity terminal of one or more batteries, and the first removable segment is removable from the first primary segment and the roof, the first removable segment being configured to electrically connect to a first primary segment of an adjacent compartment adjacent to the one or more compartments; and a second charge receiving rail attached to the roof at a second angle relative to the center line of the roof, the second charge receiving rail comprising a second removable segment and a second primary segment, the second removable segment electrically coupled to the second primary segment and extending beyond the first edge of the roof, wherein:

the second charge receiving rail is configured to electrically connect to the second charging contact and to a second polarity terminal of the one or more batteries, and the second removable segment is removable from the second primary segment and the roof, the second removable segment being configured to electrically connect to a second primary segment of the adjacent compartment.

12. The charging system of claim 11, further comprising a control center, the control center operational to:

communicate with the train;

receive, from the train, information associated with the train; and direct the train to an appropriate parking space in the charging station based on the information.

13. The charging system of claim 12, wherein the control center is further operational to:

activate one or more charging units of the plurality of charging units based on the information.

14. The charging system of claim 11, wherein:

the first charge receiving rail is further configured to:

electrically contact the second charging contact of the charging unit, and electrically connect to the second polarity terminal of the one or more batteries; and the second charge receiving rail is further configured to:

electrically contact the first charging contact of the charging unit, and electrically connect to the first polarity terminal of the one or more batteries.

15. The charging system of claim 14, wherein:

the roof comprises a first area and a second area separated by a center line of the roof, the first charge receiving rail is disposed in the first area, and the second charge receiving rail is disposed in the second area.

16. The charging system of claim 15, wherein:

the first charge receiving rail has a first length and the first angle is selected to span a first predetermined width over the first length, and the second charge receiving rail has a second length and the second angle is selected to span a second predetermined width over the second length.

17. The charging system of claim 16, wherein:

the first predetermined width is greater than or equal to a width of the first charge receiving rail, and the second predetermined width is greater than or equal to a width of the second charge receiving rail.

18. The charging system of claim 16, wherein:

the first length is equal to the second length, the first predetermined width is equal to the second predetermined width; and one of:

the first charge receiving rail is disposed parallel to the second charge receiving rail, or the first charge receiving rail and the second charge receiving rail are disposed equidistant from the center line.

19. The charging system of claim 16, wherein:

the first predetermined width is less than or equal to a width of the first charging contact, and the second predetermined width is less than or equal to a width of the second charging contact.

20. The charging station of claim 9, wherein:

the first charge receiving rail is attached to the roof at a first angle relative to a center line of the roof in a longitudinal direction of the locomotive, and the second charge receiving rail is attached to the roof at a second angle relative to the center line of the roof.

* * * * *